Sept. 23, 1969    A. PATTERSON    3,468,338

FLOW REGULATOR

Filed Aug. 22, 1967

INVENTOR
ARCH PATTERSON

BY *Robillard and Byrne*

ATTORNEYS

United States Patent Office 3,468,338
Patented Sept. 23, 1969

3,468,338
FLOW REGULATOR
Arch Patterson, 1303 Boxwood Drive,
Sea Girt, N.J. 08750
Filed Aug. 22, 1967, Ser. No. 662,410
Int. Cl. F16k *31/08, 15/04*
U.S. Cl. 137—517                                 5 Claims

ABSTRACT OF THE DISCLOSURE

A safety shut-off valve within a flow passageway having a magnetic flow-through valve seat along said passageway, a magnetic closure, and said seat and closure being located so their polarities are in repelling relationship with one another to maintain said passageway open unless a downstream loss of pressure occurs.

---

This invention relates generally to improvements in fluid control devices and particularly to fluid control devices along a fluid delivering conduit which will stop the passage of a gas or liquid upon detecting a breakage or other loss of pressure downstream. More particularly this invention provides for a magnetic shut-off valve for these purposes.

The prior art is aware of the advantages of using magnetic forces in conjunction with fluid control devices. This invention, however, utilizes magnetic forces in a novel and improved manner which provides the art with a simple, uncomplicated and substantially fail-safe fitting.

Another objective of the invention is to provide a flow regulator wherein a magnetized valve seat having a first polarity forces a magnetized check ball which is oriented so that its opposing or repelling magnetic pole is facing the check ball so that the check ball is normally magnetically biased out of engagement with its valve seat.

Another important objective of this invention is to provide a safety closure valve utilizing the properties of a magnetic ball.

A further objective of this invention is to provide a safety closure valve for placement intermediate the ends of a fluid delivering conduit which normally maintains an unrestricted passage along the passageway of a gas or liquid by utilizing repelling magnetic forces but results in valve closure in the event the pressure upstream greatly exceeds the pressure downstream.

Another important objective of this invention is to provide a unique check ball yoke and guide means for positioning a magnetized check ball.

These and other objects of the invention will become more apparent to those skilled in the art by reference to the following detailed description when viewed in light of the accompanying drawings, wherein.

Figure 1:
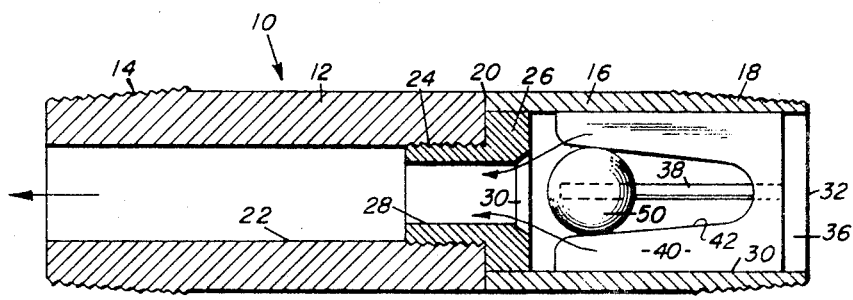
FIGURE 1 is a longitudinal cross-section of the fitting of this invention.
Figure 2:
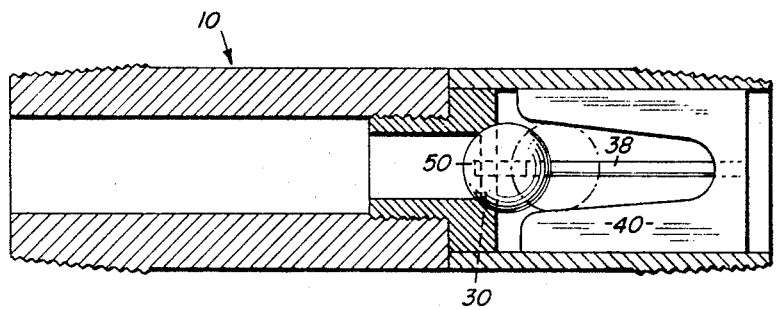
FIGURE 2 is a cross-section of FIGURE 1 showing the valve in its closed position.
Figure 3:
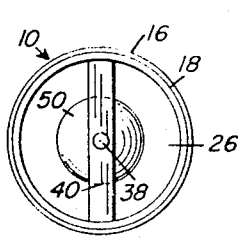
FIGURE 3 is an end view taken from the right side of FIGURE 1.

Referring now to the drawings wherein like elements are indicated by like numerals the numeral 10 indicates the regulator valve of this invention. The valve is comprised generally of a first sleeve 12 threaded at its end 14 to receive a downstream conduit and a second sleeve 16 threaded at its end 18 to receive an upstream conduit. The sleeves 12 and 16 are secured together at the joint 20 by welds or other convenient connections. The sleeves 12 and 16 can also be made integral with one another.

The sleeve 12 is provided with a passageway 22 therethrough which is internally threaded at 24. Threadedly received therein is an exteriorly threaded valve seat 26 having a passageway 28 therethrough. The passageway 28 at its upstream end is beveled at 30. The valve seat 26 is manufactured of a material capable of being permanently magnetized and is positioned so that its north and south polarities are coaxially arranged with the axis of the passageway 22.

Press-fitted or otherwise secured into the interior 30 of sleeve 18 is a ball positioning yoke member 32. The yoke member consists of a cross-bar 36, a non-ferrite positioning rod 38 having its upstream end connected to the cross-bar and extending coaxial with the unit toward the valve seat 30 and a plate 40 having a tapered groove 42 formed throughout much of its length. The yoke member can be of a one-piece construction. Adapted to be slidably received on the non-magnet positioning rod 38 is a magnetized check ball 50 bored at 52 along its axis of polarity.

Figure 4:
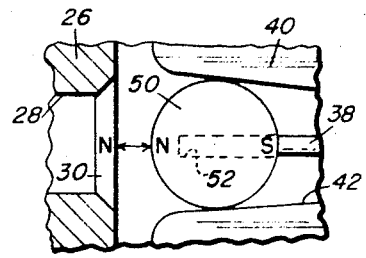
FIGURE 4 is an enlarged view of a portion of FIGURE 1 showing the polarity of the respective elements.

FIGURE 4 is exemplary of how the elements are arranged. The valve seat 26 is positioned so that one polarity, said north polarity for example, is facing upstream. With the valve seat polarity so arranged, the ball 50 is inserted on the positioning rod 38 such that its north polarity is in opposing repelling relationship with the polarity of the valve seat. As seen by the arrow in FIGURE 4, the normal position of ball 50 in the absence of other pressures, is away from its valve seat. However, as is well known in the art, there are other pressures exerted on a slidable ball within a flow passageway. Assuming that fluid flow is from end 18 to end 14. In normal operation, the ball 50 will adhere to plate 40. The magnetizing forces on the ball are such that the opposing polarities are an aid in maintaining the ball away from its valve seat when pressure in passageway 22 is substantially the same as in passageway 30. However, in the event of a rapid loss of pressure downstream (in passageway 22), the difference in pressure immediately causes the ball 50 to seat in opposition to the magnetic forces.

The ball has an area of free slidable movement along the guide rod 38. As the rate of flow varies, the ball is permitted a certain responsive movement. Because of the magnetic repelling forces, the ball will not seat unless the pressure downstream decays very rapidly. The tapered slot 52 together with rod 38 stabilizes lateral movement of the ball within the conduit to prevent rattling or other undesirable noises.

I claim:

1. A fluid control device comprising a housing having a flow passage therethrough having a fluid receiving end connected to an upstream source of pressurized fluid and a second downstream end;

a valve seat of magnetic material having a flow-through passageway disposed in said flow passage intermediate said first and second ends and having one end of a first polarity facing toward said fluid receiving end;

a magnetic valve closure member having a diameter less than said flow passage but greater than that of said flow-through passageway located between said valve seat and said fluid receiving end;

said member having a first end of the same polarity as said first polarity of said seat and a second end of opposite polarity; and means to slidably position said first end toward said one end in magnetic repelling relationship.

2. The fluid control device of claim 1 wherein said closure member is a ball.

3. The fluid control device of claim 1 wherein said means is a stop member affixed across said passageway, a non-ferrite guide rod extends from said stop member in the direction of said valve seat and said closure member is received on said rod.

4. The fluid control device of claim 3 wherein said rod is non-magnetic.

5. The fluid control device of claim 1 wherein said means includes a yoke member affixed to said passageway a relatively short distance from said seat.

References Cited

UNITED STATES PATENTS

| | | | |
|---|---|---|---|
| 602,696 | 4/1898 | Chateau | 251—65 |
| 2,569,316 | 9/1951 | Jerman | 137—517 |
| 2,667,895 | 2/1954 | Pool et al. | 251—65 XR |
| 2,821,209 | 1/1958 | Waterman | 137—498 |
| 3,106,226 | 10/1963 | Machen | 137—517 XR |
| 3,200,214 | 8/1965 | Aubert. | |
| 3,212,539 | 10/1965 | Felix | 251—65 XR |
| 3,286,742 | 11/1966 | Doll | 251—65 XR |
| 3,407,827 | 10/1968 | Follett | 251—65 XR |

M. CARY NELSON, Primary Examiner

R. J. MILLER, Assistant Examiner

U.S. Cl. X.R.

251—65